May 15, 1934.  O. T. HANDWERK  1,958,574

MERCURY SWITCH CONTROLLER

Filed Feb. 5, 1931

Inventor
Otto T. Handwerk.
per James B. Lewis
Attorney

Patented May 15, 1934

1,958,574

UNITED STATES PATENT OFFICE 1,958,574

MERCURY SWITCH CONTROLLER

Otto T. Handwerk, Chicago, Ill.

Application February 5, 1931, Serial No. 513,661

10 Claims. (Cl. 200—56)

This invention relates to apparatus for the automatic control of a condition or value to be regulated or maintained at some predetermined value. More particularly, the invention relates to a mechanical mechanism for affecting a control of the condition or value and cooperating with a movable element responsive either directly or indirectly to some function of the value to be controlled.

One object of the invention is to provide a regulating or control mechanism of a mechanical nature controlled in its operation by the position of a sensitive index which is free the greater part of its time to respond to its motivating force.

Another object of the invention is to provide a mechanical means cooperating with and controlled by a sensitive index for affecting the control of a mechanism for regulating a condition or value.

A further object of the invention is to provide a reliable, efficient, and rugged type of control mechanism. With these and other objects in view, the invention consists of certain novel features of construction and operation as will be fully described and particularly pointed out in the specification, drawing, and claims.

In the drawing, which illustrates several embodiments of the invention and wherein like reference characters designate like parts,—

Figure 1:
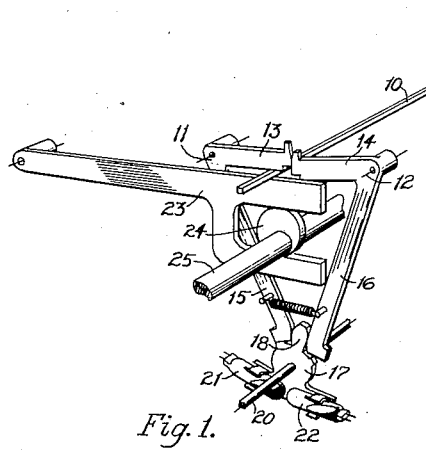
Fig. 1 is a fragmentary perspective elevation more or less diagrammatic of a device which is the subject of this invention.

The regulating apparatus shown in the drawing is capable of many adaptations and variations other than those illustrated and the invention is capable of controlling various conditions such as pressure, flow of fluids, speed of a prime mover, temperature, and the like.

While the apparatus is illustrated somewhat diagrammatically, it is to be understood that such apparatus is housed in a suitable casing as is customary in such control apparatus. The index 10, adapted to cooperate with a scale, not shown, to indicate the instantaneous values of the condition, may be operated by any suitable instrument functionally related to the value or condition to be controlled and as will be obvious, the type of instrument will depend upon the nature of the condition to be controlled.

In so far as the operation of the regulating apparatus is concerned, it is not essential that the index be directly responsive to the condition to be controlled. It may as well be functionally related in some manner to such condition. The regulating apparatus, however, produces its greatest advantage when the index is directly related to the condition so that the regulating apparatus may form a part of the governing mechanism controlling the condition.

Figure 2:
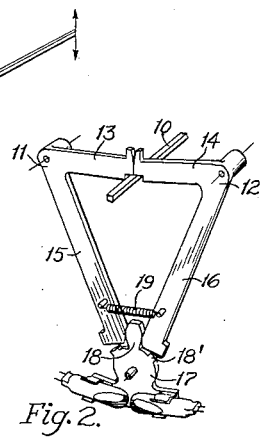
Figs. 2 and 3 illustrate the mechanism in different operative positions.
Figure 3:
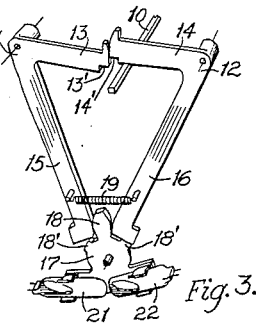

Referring first to Figs. 1, 2, and 3, the contacting mechanism designed to affect a control of the condition comprises two pivotally mounted members 11 and 12 having portions 13 and 14 respectively extending substantially parallel with but slightly above the plane of movement of the index. These two portions 13 and 14 are notched at their adjacent ends as at 13' and 14' respectively, and the width of the respective notches is such as to accommodate the pointer therein and represent the limits of movement of the pointer when the condition is at the normal or predetermined point and which requires no further control. The width of the combined length of these slots may obviously be varied in accordance with the limits of movement of the pointer for the particular condition to be controlled. The members 11 and 12 include arms 15 and 16 adapted to coact with a control member 17 provided with a tooth 18 and stops 18' on opposite sides of the tooth.

The arms 15 and 16 coact with the tooth 18 and are maintained in coacting relationship therewith by means of a spring 19. Control member 17 is pivotally mounted on a shaft 20 and in the present instance, carries two single pole mercury switches 21 and 22 forming parts of control circuits including suitable means for affecting the regulating action of the condition to be controlled or they may be connected to signalling or indicating means for giving appropriate signals or indications indicative of the type of control action necessary to maintain the condition at the desired or predetermined point for which the control is set. While two single pole switches are shown, it is to be understood that they are illustrative only and that other types of switches may be used in lieu of those shown. Manifestly, a double pole switch could be substituted for those shown or other types and arrangements thereof could be used with equal facility.

The contacting mechanism also includes an oscillator 23 adapted to beat across the plane of movement of the index for causing the index to contact with and actuate the portions 13 and 14 to effect the desired control. The oscillator is operated by a cam 24 mounted upon a shaft 25 driven by any suitable power device which may be either of the intermittent or continuous type. For example, a constant speed electric motor is satisfactory for the purpose.

The operation of the mechanism thus far described is as follows: Assuming that the condition, such as pressure, fluid flow, temperature, etc. to be controlled is at the normal or predetermined point at which it is to be maintained. Under these conditions the mechanism will occupy the position illustrated in Fig. 2 wherein the index 10 will be reciprocated by the oscillator 23 into and out of the notches 13' and 14' and the control switches 21 and 22 will be in open position. If a variation in the condition to be controlled manifests itself, this variation will be deflected by movement of the index 10 in either direction from the normal or initial position illustrated in Fig. 2. Assume that the value of the condition has decreased, this will cause a deflection of the index to the left, thus indicating that the condition should be increased to restore it to its normal or predetermined point. Deflection of the index 10 to the left, as in Fig. 1, brings it beneath the portion 13 and as the oscillation 23 is raised, the index is raised against the portion 13 thereby moving the arm 15 to the right and tilting the control member to the right until the stop 18' abuts the bottom of arm 15 and arrests further tilting movement of the control member and maintains said member in the position illustrated in Fig. 1. Tilting of the control member 17 to the right closes the mercury switch 22 to effect an increase of the condition to be controlled.

As the condition increases, in response to the control action, the index 10 moves toward its initial position and when it has moved sufficiently to intercept, when raised, the notch 14', the member 14 will be raised to the position of Fig. 2 and during this raising movement the member 13 is moved to the position illustrated in Fig. 2. This movement of the portion 14 restores the control member 17 to its normal position and the condition is again reduced to its normal or predetermined value. If the condition increases beyond that set for the predetermined point, the increase will cause a movement of the index 10 to the right as is illustrated in Fig. 3. Upward movement of the oscillator causes the index 10 to contact with and raise the portion 14 thereby shifting the control member to the left as illustrated in Fig. 3 whereupon the mercury switch 21 is closed and the condition accordingly reduced. This reduction of the condition will cause the index again to deflect towards its normal position and as soon as it has moved sufficiently to intercept the notch 13' of the portion 13, movement of the oscillator will raise the portion 13 and accordingly lower the portion 14 to the position of Fig. 2 shifting the control member 17 to its normal position.

From the foregoing, it will be apparent that the index 10, responsive to changes in the condition, selects the proper control to be made to restore the condition to its normal or predetermined value and that deflection of the index shifts the control member to a definite position where it remains until a further control is to be effected.

Figure 4:
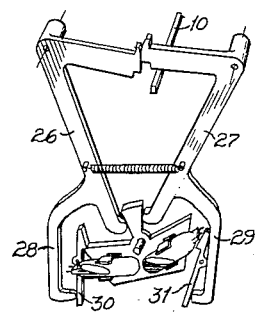
Fig. 4 illustrates a modified form of the device of Fig. 1.

In some instances it may be desirable to provide means for positively retaining the control member in either of its tilted positions, one form of such a means is illustrated in Fig. 4 wherein the members 26 and 27 are provided with auxiliary arms 28 and 29 adapted to cooperate with and actuate the latches 30 and 31 respectively. These latches are adapted to retain the control member 32 in either of its tilted positions as illustrated in Fig. 4 and are released by the auxiliary arm cooperating therewith. For example, in Fig. 4, when the member 26 is shifted to the right the arm 28 presses against the latch 30 to release the control member 32 permitting it to shift to its other position. During the releasing movement of the one latch 30 by its auxiliary arm 28, the other auxiliary arm 29 is positioning its latch 31 to coact with the control member 32 when it is shifted to the right. While this form of retaining mechanism provides a convenient means for retaining the control member in either of its extreme positions, it is to be understood that other forms of latch mechanism may be also provided.

Figure 5:
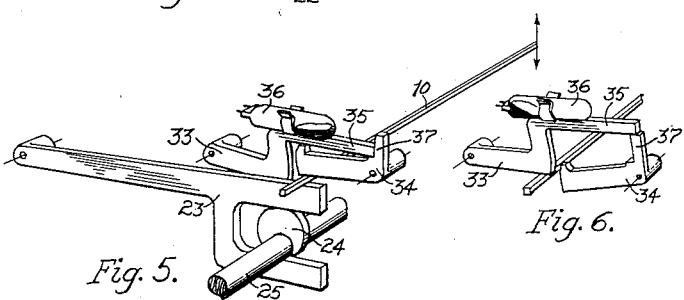
Fig. 5 illustrates a further modification of the invention.
Figure 6:
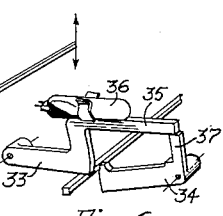
Fig. 6 illustrates a different operative position of Fig. 5.

In Fig. 5 a modified form of contacting mechanism is shown in which two operating members 33 and 34 are provided so that portions thereof occupy the same relative position to the index as the portions 13 and 14 of the members 11 and 12. In this illustration, the member 33 is provided with an arm 35 upon which the mercury switch 36 is mounted and the switch is adapted to be either on or off depending upon the position of the arm 35, which is illustrated in the off position. Upon deflection of the index 10 to the left beneath the member 33, the actuator raises the index against said member and lifts the member and the arm 35 above the short arm 37 of the member 34, whereupon the arm 37 drops beneath the member 35, as in Fig. 6, and retains the member in its raised position with the mercury switch 36 in closed position. In this position the closing of the switch affects a control of the condition to increase the same and when the increase has been sufficient to restore the condition to its normal or predetermined value, the index will deflect to the right and upon actuation by the oscillator will raise the member 34 thereby unlatching the arm 37 from the arm 38 and permitting the latter arm to drop to the position illustrated in Fig. 5 whereupon the mercury switch will be opened and the control of the condition discontinued. In this type of control the condition is either entirely on or entirely off depending upon the condition of the mercury switch which regulates the value of the condition.

Figure 7:
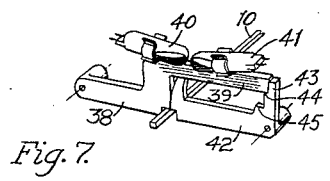
Fig. 7 is a further modification of Fig. 5.

A modification of the arrangement of Fig. 5 whereby two mercury switches may be utilized is illustrated in Fig. 7 wherein the member 38 is provided with an elongated arm or support 39 upon which the two mercury switches 40 and 41 are mounted so as to be either alternately opened and closed, or both open depending upon the position of the arm 39. In Fig. 7 the parts are illustrated in the normal position with both of the switches 40 and 41 open. This position corresponds to the position of the apparatus in Fig. 2 wherein the control is at the predetermined point. The member 42 is provided with a latch arm 43 adapted to coact with the support arm 39 to retain the latter in certain selected positions depending upon the position of the index. For example, upon deflection of the index 10 to the left the oscillator will raise the member 38 and support 39 whereupon the latch arm 43 will pass beneath the arm 39 and retain said arm in raised position with the mercury switch 40 closed. Closure of the mercury switch 40 affects the control to increase the value of the condition and as the condition approaches its normal value the index will return to its normal position whereupon the member 42 will be raised to unlatch the arm 43 from the support 39 permitting said support to drop to and rest upon the notch 44 as illustrated in Fig. 7. Upon deflection of the index 10 to the right, the member 42 will be raised thus releasing the arm 39 of the notch 44 permitting the same to drop to and rest upon the notch 45 with the mercury switch 41 in closed position. Closure of the switch 41 will affect a control of the condition to decrease its value to restore the same to normal whereupon the index 10, in response to this decrease, deflects to the position of Fig. 7 and the member 38 is raised to the position where the arm 39 thereof rests upon the notch 44.

Figure 8:
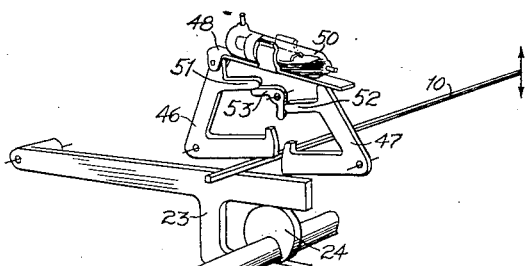
Fig. 8 illustrates a further form of the invention.

A further modification of the control mechanism is illustrated in Fig. 8 wherein the bell crank members 46 and 47 are pivotally mounted so that portions thereof are arranged slightly above the plane of the index and are adapted to be actuated by the actuator as in the preceding illustrations. The member 46 has pivotally connected thereto a switch carrying support 48 adapted to slidably rest upon the top of the member 47 as illustrated.

The members 46 and 47 are provided with laterally extending arms 51 and 52 respectively adapted to coact with a latch member 53 designed to maintain said parts in either one of two positions. The switch 50 carried by the support 48 is adapted to occupy either one of two positions depending upon the nature of the control to be affected, or the support may carry two switches similar to the arm 39 of Fig. 7. In operation, the members 46 and 47 are adapted to be alternately actuated according to the direction of the deflection of the index 10. Upon deflection of the index to the left the member 46 is raised and the latch 53 maintains said member in raised position. During the elevation of the member 46 the latch member 53 turns clockwise permitting the member 47 to shift to its lowermost position wherein it latches the member 46 in fixed raised position. Upon deflection of the index to the right and actuation thereby by the oscillator, the member 47 will be raised whereupon the latch 53 turns counterclockwise permitting the arm 46 to move to its lowermost position and at the same time locking the member 47 in its raised position. Raising of the member 47 shifts the support 48 closing the switch 50.

From the foregoing, it will be seen that the device may be varied to suit particular conditions and while the contacting members have been illustrated as disposed above the path of movement of the index, it is to be understood that they may be disposed below and the actuator above the path of movement of the index, whereupon the index will be deflected downwardly by the oscillator rather than upwardly as illustrated.

The term "index" must be considered wherever used herein, as a broad comprehensive term intended to include any responsive element which may be moved by a slight motivating force.

It is to be understood that the invention is not limited by the exact embodiments shown, which are merely by way of illustration and not limitation, as various and other forms of the device will, of course, be apparent to those skilled in the art without departure from the spirit of the invention or the scope of the claims.

What is claimed is:

1. The combination with an index movable in a plane and a member to be controlled in accordance with the deflection of the index, of pivoted members positioned in proximity to the plane of movement of index for actuating said control member, an oscillator beating across the plane of the index to cause said index to selectively engage one of said pivoted members to actuate the control member to one position, a latch for positively retaining said control and associated pivoted member in actuated position, and means operable when said index moves out of engagement with said pivoted member to release said latch.

2. In a control apparatus, an index movable in a plane and adapted to reflect changes in a condition, contacting members positioned in close proximity to the plane of movement of the index and adapted to be selectively actuated thereby upon deflection thereof from said plane, a single control member having mounted thereon two mercury contacting switches the first of which is open and the second of which is closed when the control member is in one position and the second of which is open and the first of which is closed when the control member is in another position, periodically actuating means for deflecting said index out of its plane of movement to selectively actuate one or the other of said contacting members to move the control member to the corresponding one of said two positions, and latch means controlled by said contacting members for releasably holding the control member in either position.

3. A control apparatus comprising an index movable in a plane in response to changes in a condition from a predetermined value, two members positioned in close proximity to the plane of movement of the index and each having an arm, a pivoted member actuated by said arms and having switch means having two extreme positions adapted to close different circuits and an intermediate position opening both circuits and which is mounted thereon to be operated as the member is rocked about its pivot, an oscillator periodically deflecting said index out of its plane of movement to selectively actuate one or the other of said members according to the deflection of the index from a central position to move the switch means to the corresponding extreme position and to move the switch means to its intermediate open position when the index is in said central position, and latch means controlled by said first named members for releasably holding the switch means in either of its extreme positions.

4. In a control system for the regulation of a condition, a condition sensitive index deflectable in opposite direction from a neutral position, a pair of bell crank members each having an arm extending adjacent the path of movement of the index and on opposite sides of the neutral position, a tiltable mercury switch supporting member adapted to be selectively actuated by said bell cranks, an oscillator for deflecting said index against one or the other of said arms to selectively actuate said tiltable member to one position or another according to the position of the index to one of the sides of its neutral position, and a releasable latch actuable by said bell cranks for positively retaining said tiltable member in either position.

5. In a control apparatus, a condition sensitive index deflectable in a plane from an initial position, two pivoted bell crank members, each having an arm extending parallel to the plane of movement of the index and on either side of the initial position of the index, each of said members having another arm, said latter arms generally converging toward each other, a tiltable control member alternately actuable by said latter arms and having a mercury switch mounted thereon, an oscillator for moving said index out of its normal plane to selectively strike one or the other of the extending arms of the bell cranks to actuate the tiltable control member to one position, a latch for retaining said control member in position and an auxiliary finger on each of said converging arms for releasing said latch upon actuation of the other arm.

6. In a control apparatus, a movable index deflectable in a plane from an initial position, contacting arms positioned on each side of the initial position of the index in proximity to the plane of movement of the index, a control member, means actuated by said arms for positioning said member, means for causing said index and contacting arms to selectively coact to move said control member to one position or another depending upon the direction of deflection of the index from its initial position, and a pair of releasable latches controlled by said arms in such a manner that when one arm is actuated to move the control member the member and arm are positively retained in one position until the other arm is actuated by return of the index to its initial position, whereupon the control member and arm are released to return to normal position 7. The combination of an index deflectable in a plane in opposite directions from an initial position, of a pair of contacting devices on opposite sides of the initial position of the index and adapted to coact with said index, a control member adapted to be alternately operated by said devices, and power means for causing said index to coact with one of said devices to operate the control member to one or another of two positions according to the direction of deflection of the index, a latch arranged to lock said device and control member in actuated position, said power means causing said index and other contact device to coact upon deflection of the index in the other direction to actuate said control member to its other position to restore the first device to operative position and another latch arranged then to lock the second device in an actuated position.

8. In a control apparatus, an index movable in a plane and adapted to reflect changes in a condition, contacting members positioned in proximity to the plane of movement of the index and adapted to be selectively actuated thereby upon deflection thereof from said plane, a movable support having two extreme positions and an intermediate position, a pair of mercury switches on the support one of which is open and the other of which is closed in one extreme position of the support and vice versa in the other extreme position of the support and both of which are open in the intermediate position of the support, and which are adapted to be alternately open and closed according to the movement of said member and to remain in such position until the other of said contacting members is actuated, latch means controlled by said contacting members for holding the support in its extreme positions, and periodically actuating means for deflecting said index out of its plane of movement to selectively actuate one or the other of said contacting members depending upon the extent of movement of the index to move the support to one or the other of its three positions.

9. The combination with an index movable in a plane and a mercury switch to be controlled in accordance with the deflection of the index, of pivoted members positioned in proximity to the plane of movement of the index for actuating said mercury switch, an oscillator beating across the plane of the index to cause said index to selectively engage one of said pivoted members to actuate the mercury switch to one position and a latch for positively retaining said mercury switch and said pivoted member in actuated position and which latch is releasable by the operation of one of said pivoted members.

10. In a control appartus having an index movable in accordance with changes in a condition to be controlled, a control member, means including a pair of pivoted arms adapted to coact with said index to move said control member into either of two operative positions or into inoperative position in accordance with the position of said index, latch means for holding said control member in either of its operative positions, and means operable in accordance with movement of said index for releasing said latch means.

OTTO T. HANDWERK.